(12) United States Patent
Zook et al.

(10) Patent No.: US 6,232,401 B1
(45) Date of Patent: May 15, 2001

(54) COMPOSITION FOR PRODUCING FUEL RESISTANT LIQUID POLYTHIOETHER POLYMERS WITH GOOD LOW TEMPERATURE FLEXIBILITY

(75) Inventors: Jonathan Doherty Zook, Santa Clarita; Suzanna Gibson DeMoss, Van Nuys; David Weldon Jordan, Reseda; Chandra B. Rao, Valencia, all of CA (US)

(73) Assignee: PRC-DeSoto International, Inc., Glendale, CA (US)

( * ) Notice: Subject to any disclaimer, the term of this patent is extended or adjusted under 35 U.S.C. 154(b) by 0 days.

(21) Appl. No.: 09/318,500

(22) Filed: May 25, 1999

Related U.S. Application Data

(62) Division of application No. 08/802,130, filed on Feb. 19, 1997, now Pat. No. 5,912,319.

(51) Int. Cl.$^7$ .................................................. C08F 8/00
(52) U.S. Cl. .................. 525/191; 528/373; 528/374; 528/378; 568/29; 524/609
(58) Field of Search .................. 528/373, 374, 528/378, 212; 568/29; 524/609; 525/212, 191

(56) References Cited

U.S. PATENT DOCUMENTS

| | | | |
|---|---|---|---|
| 3,506,626 | 4/1970 | Warner et al. | 260/79 |
| 3,697,402 | 10/1972 | Kehr et al. | 204/159.14 |
| 3,725,229 | 4/1973 | Kehr et al. | 204/159.14 |
| 3,734,968 | 5/1973 | Hickner | 260/609 |
| 4,366,307 | 12/1982 | Singh et al. | 528/373 |
| 4,609,762 | 9/1986 | Morris et al. | 568/38 |
| 5,225,472 | 7/1993 | Cameron et al. | 524/368 |
| 5,516,455 | 5/1996 | Jacobine et al. | 252/299.01 |

OTHER PUBLICATIONS

E. Klemm and St. Sensfuss "Addition Polymerization of Aliphatic Dithiols with Diene Monomers" J. Makromol. Sci.—Chem., A28(9), pp. 875–883 (1991).
Oskar Nuyken and Thomas Volkel "Telechelics via addition of dithiols onto alkadienes, 1 Radical Mechanism" Apr. 26, 1990 Makromol. Chem., Rapid Commun. 11, pp. 365–373 (1990).
Bruno Amedurl, Khalid Berrada, Bernard Boutevin, Roy D. Bowden and Lucia Pereira "Synthesis of telechelic monodispersed dithiols" Polymer Bulletin 26, pp. 377–382 (1991) 38—Plastics Fabr., Uses, vol. 103, 1985, 103: 197058z.

(List continued on next page.)

*Primary Examiner*—Duc Truong
(74) *Attorney, Agent, or Firm*—Ann Marie Cannoni (57) ABSTRACT

A polythioether includes a structure having the formula I $$-R^1-[-S-(CH_2)_2-O-[-R^2-O-]_m-(CH_2)_2-S-R^1-]_n-\quad \text{I}$$

wherein
$R^1$ denotes a divalent $C_{2-6}$ n-alkyl, $C_{3-6}$ branched alkyl, $C_{6-8}$ cycloalkyl or $C_{6-10}$ alkylcycloalkyl group, $-[(-CH_2-)_p-X-]_q-(-CH_2-)_r-$, or $-[(-CH_2-)_p-X-]_q-(-CH_2-)_r-$ in which at least one $-CH_2-$ unit is substituted with a methyl group,
$R^2$ denotes methylene, a divalent $C_{2-6}$ n-alkyl, $C_{2-6}$ branched alkyl, $C_{6-8}$ cycloalkyl or $C_{6-10}$ alkylcycloalkyl group, or $-[(-CH_2-)_p-X-]_q-(-CH_2-)_r-$,
X denotes one selected from the group consisting of O, S and $-NR^6$,
$R^6$ denotes H or methyl,
m is a rational number from 0 to 10,
n is an integer from 1 to 60,
p is an integer from 2 to 6,
q is an integer from 0 to 5, and
r is an integer from 2 to 10.

The polythioether is a liquid at room temperature and pressure.

11 Claims, 2 Drawing Sheets

OTHER PUBLICATIONS

Koichi Yamaguchi, Nobuo Yamada and Yuji Minoura "Reaction of thiol to diene polymer in the presence of various catalysts" Nov. 14, 1972, Polymer, 1973, vol. 14, Mar., pp. 87–90.

C.S. Marvel and A.H. Markhard, Jr. "Polyalkylene Sulfides. VI. New Polymers Capable of Cross–Linking" Journal of Polymer Science, vol. VI, No. 6, pp. 711–716.

C.S. Marvel and Harry N. Cripps "Polyalkylene Sulfides. X. The Reaction of Hexamethylenedithiol with 1,3–Butadiene" Journal of Polymer Science, vol. Viii, No. 3, pp. 313–320.

Gangfeng Cai, Robert G. Gastinger "Synthesis of Poly(thioether ether)s from Diallyl Ether".

Oskar Nuyken, Thomas Vökel, Thomas Pöhlmann "Heat–resistant polysulfides from 1,3–benzenedithiol and norbornadiene" Nov. 19, 1990, Makromol. Chem. 192 (1991) pp. 1959–1968.

Oskar Nuyken, Victor S.C. Chang and Joseph P. Kennedy New Telechelic Polymers and Sequential Copolymers by Polyfunctional Initiator–Transfer Agents (Inifers), Polymer Bulletin 4, pp. 61–65 (1981).

Chemical Abstracts Selects: Novel Polymers from Patents, Issue 7, 1992, 116:10748n 112186X: Paul F. Warner and Merline E. Bentley "Organic sulfur polymers" Aug. 14, 1970.

Abstract of U.S. Patent No. 2,664,414–Dec. 29, 1953.

Elizabeth Klemm, Steffi Sensfuss and Heldrun Schütz "Photoinduzierte Thiol–En–Additionspolymerisation", Chem., 27Jg, (1987) Heft 4, pp. 145–146.

E. Klemm and U. Beil "Unusual addition by the thiol–ene photopolymerization" Polymer Bulletin 28, pp. 653–656 (1992).

Oskar Nuyken and Manfred Hofinger "New Sulfur Containing Polymers" Polymer Bulletin 11, pp. 165–170 (1984).

Organic Sulfur Chemistry: Structure & Mechanism, pp. 408–410 and 418.

Elizabeth Klemm, Steffi Sensfuss, Uta Holfter and Heidrun Schütz "Untersuchungen zur linearen Thiol–En–Photopolymerisation" Makromol. Chem. 191, pp. 2403–2411 (1990).

O. Nuyken and Th. Völkel "Dimercapto Telechelics by Polyaddition of Diothiols onto Diolefines" pp. 197–198.

G.K. Musorin, S.V. Amosova, and V.V. Shcherbakov "A simple Synthesis of 2–Methyl–1,4–Dithiacycloheptane from diallyl Sulfide and Hydrogen Sulfide" 1991 Plenum Publishing Corporation, p. 2423.

Nancy H. Haucourt, Libing Peng and Eric J. Goethals "Spontaneous Block–Copolymer Formation by Cationic Polymerization of a Vinyl Ether in the Presence of a Cuclic Sulfide" Macromolecules 1004, 27, pp. 1329–1333.

COMPOSITION FOR PRODUCING FUEL RESISTANT LIQUID POLYTHIOETHER POLYMERS WITH GOOD LOW TEMPERATURE FLEXIBILITY

This application is a divisional of Ser. No. 08/802,130 filed Feb. 19, 1997 now U.S. Pat. No. 5,912,319.

FIELD OF THE INVENTION

The present invention relates to liquid polythioether polymers that have good low temperature flexibility and fuel resistance when cured. The invention is also directed to methods for making the polymers by reacting polythiols with oxygenated dienes (divinyl ethers) which substantially eliminate malodorous condensed cyclic by-products.

BACKGROUND OF THE INVENTION

Thiol-terminated sulfur-containing polymers are known to be well-suited for use in aerospace sealants due to their fuel resistant nature upon cross-linking. Among the commercially available polymeric materials which have sufficient sulfur content to exhibit this desirable property are the polysulfide polyformal polymers described, e.g., in U.S. Pat. No. 2,466,963, and the alkyl side chain containing polythioether polyether polymers described, e.g., in U.S. Pat. No. 4,366,307 to Singh et al. Materials useful in this context also have the desirable properties of low temperature flexibility (low glass transition temperature $T_g$) and liquidity at room temperature.

An additional desirable combination of properties for aerospace sealants which is much more difficult to obtain is the combination of long application time (i.e., the time during which the sealant remains usable) and short curing time (the time required to reach a predetermined strength). Singh et al., U.S. Pat. No. 4,366,307, disclose such materials. Singh et al. teach the acid-catalyzed condensation of hydroxyl-functional thioethers. The hydroxyl groups are in the β-position with respect to a sulfur atom for increased condensation reactivity. The Singh et al. patent also teaches the use of hydroxyl-functional thioethers with pendent methyl groups to afford polymers having good flexibility and liquidity. However, the disclosed condensation reaction has a maximum yield of about 75% of the desired condensation product. Furthermore, the acid-catalyzed reaction of β-hydroxysulfide monomers yields significant quantities (typically not less than about 25%) of an aqueous solution of thermally stable and highly malodorous cyclic byproducts, such as 1-thia-4-oxa-cyclohexane. As a result, the commercial viability of the disclosed polymers is limited.

Another desirable feature in polymers suitable for use in aerospace sealants is high temperature resistance. Inclusion of covalently bonded sulfur atoms in organic polymers has been shown to enhance high temperature performance. However, in the polysulfide polyformal polymers disclosed in U.S. Pat. No. 2,466,963, the multiple —S—S— linkages in the polymer backbones result in compromised thermal resistance. In the polymers of Singh et al., U.S. Pat. No. 4,366,307, enhanced thermal stability is achieved through replacement of polysulfide linkages with polythioether (—S—) linkages. In practice, however, the disclosed materials also have compromised thermal resistance due to traces of the residual acid condensation catalyst.

Morris et al., U.S. Pat. No. 4,609,762, describes reacting dithiols with secondary or tertiary alcohols to afford liquid polythioethers having no oxygen in the polymeric backbone. Cured polymeric materials formed from these polymers have the disadvantage, however, of reduced fuel resistance due to the large number of pendent methyl groups that are present. In addition, residual catalyst from the disclosed process generates undesirable aqueous acidic waste.

Cameron, U.S. Pat. No. 5,225,472, discloses production of polythioether polymers by the acid-catalyzed condensation of dithiols with active carbonyl compounds such as HCOOH. Again, this process generates undesirable aqueous acidic waste.

The addition polymerization of aliphatic dithiols with diene monomers has been described in the literature. See, e.g., Klemm, E. et al., *J. Macromol Sci.—Chem.*, A28(9), pp. 875–883 (1991); Nuyken, O. et al., *Makromol. Chem., Rapid Commun.* 11, 365–373 (1990). However, neither Klemm et al. nor Nuyken suggest selection of particular starting materials, specifically divinyl ethers and dithiols, such that a polymer is formed that is liquid at room temperature and, upon curing, has excellent low-temperature flexibility (low $T_g$) and high resistance to fuels, i.e., hydrocarbon fluids. Nor do Klemm et al. suggest production of a polymer that in addition is curable at room or lower temperatures. Moreover, the reactions disclosed by Klemm et al. also generate undesirable cyclic byproducts.

SUMMARY OF THE PREFERRED EMBODIMENTS

In accordance with one aspect of the present invention, there is provided a polythioether having the formula I wherein
$R^1$ denotes a divalent $C_{2-6}$ n-alkyl, $C_{3-6}$ branched alkyl, $C_{6-8}$ cycloalkyl or $C_{6-10}$ alkylcycloalkyl group, —[(—CH$_2$—)$_p$—X—]$_q$—(—CH$_2$—)$_r$—, or —[(—CH$_2$—)$_p$—X—]$_q$—(—CH$_2$—)$_r$— in which at least one —CH$_2$— unit is substituted with a methyl group,
$R^2$ denotes methylene, a divalent $C_{2-6}$ n-alkyl, $C_{2-6}$ branched alkyl, $C_{6-8}$ cycloalkyl or $C_{6-10}$ alkylcycloalkyl group, or —[(—CH$_2$—)$_p$—X—]$_q$—(—CH$_2$—)$_r$—,
X denotes one selected from the group consisting of O, S and —NR$^6$—,
$R^6$ denotes H or methyl,
m is a rational number from 0 to 10,
n is an integer from 1 to 60,
p is an integer from 2 to 6,
q is an integer from 1 to 5, and
r is an integer from 2 to 10,
the polythioether being a liquid at room temperature and pressure.

Preferably the polythioether has a number average molecular weight between about 500 and about 20,000.

In a first preferred embodiment, the polythioether has the formula II wherein
A denotes a structure having the formula I,
y is 0 or 1,
$R^3$ denotes a single bond when y=0
and —S—(CH$_2$)$_2$—[—O—R$^2$—]$_m$—O— when y=1,
$R^4$ denotes —SH or —S—(—CH$_2$—)$_2$—O—R$^5$ when y=0
and —CH$_2$=CH$_2$ or —(CH$_2$—)$_2$—S—R$^5$ when y=1,
$R^5$ denotes $C_{1-6}$ n-alkyl which is unsubstituted or substituted with at least one —OH or —NHR$^7$ group, and
$R^7$ denotes H or a $C_{1-6}$ n-alkyl group.

Polythioethers in which $R^4$ is —SH are "uncapped," that is, include unreacted terminal thiol groups. Polythioethers according to the invention also include "capped" polythioethers, that is, polythioethers including terminal groups other than unreacted thiol groups. These terminal groups can be groups such as —OH or —$NH_2$, or groups such as alkyl or terminal ethylenically unsaturated groups.

In a more particular preferred embodiment, y=0 in formula II and $R^4$ denotes —SH. That is, the polythioether is an uncapped polythioether having the structure $$HS—R^1—[—S—(CH_2)_2—O—[—R^2—O—]_m—(CH_2)_2—S—R^1—]_n—SH.$$

In another more particular preferred embodiment, the inventive polythioether is a capped polythioether in which y=0 in formula II and $R^4$ denotes —S—(—$CH_2$—)$_2$—O—$R^5$. Particularly preferably, $R^5$ is an unsubstituted or substituted n-alkyl group such as ethyl, 4-hydroxybutyl or 3-aminopropyl.

In still another particular preferred embodiment, y=1 in formula II and $R^4$ denotes —CH=$CH_2$. That is, the polythioether is an uncapped polythioether having terminal vinyl groups.

In yet another more particular preferred embodiment, the inventive polythioether is a capped polythioether in which y=1 in formula II and $R^4$ denotes —($CH_2$—)$_2$—S—$R^5$.

In a second preferred embodiment, the polythioether has the formula III $$B—(A—[R^3]_y—R^4)_z \qquad \text{III}$$

wherein
A denotes a structure having the formula I,
y is 0 or 1,
$R^3$ denotes a single bond when y=0
and —S—($CH_2$)$_2$—[—O—$R^2$—]$_m$—O— when y=1,
$R^4$ denotes —SH or —S—(—$CH_2$—)$_2$—O—$R^5$ when y=0
and —$CH_2$=$CH_2$ or —($CH_2$—)$_2$—S—$R^5$ when y=1,
$R^5$ denotes $C_{1-6}$ n-alkyl which is unsubstituted or substituted with at least one —OH or —$NHR^7$ group,
$R^7$ denotes H or a $C_{1-6}$ n-alkyl group.
z is an integer from 3 to 6, and
B denotes a z-valent residue of a polyfunctionalizing agent.

That is, the polyfunctionalized embodiments include three or more structures of the formula I bound to the residue of an appropriate polyfunctionalizing agent.

In a more specific embodiment, z is 3, and the polyfunctionalizing agent thus is a trifunctionalizing agent. In another more specific embodiment, the average functionality of the polythioether ranges between about 2.05 and about 3.00.

In accordance with another aspect of the present invention, there are provided methods of producing the foregoing polythioethers.

According to a first preferred embodiment, a polythioether of the invention is produced by reacting (n+1) equivalents (e.g., moles) of a compound having the formula IV $$HS—R^1—SH \qquad \text{IV}$$

or a mixture of at least two different compounds having the formula IV, with (n) equivalents of a compound having the formula V $$CH_2=CH—O—[—R^2—O—]_m—CH=CH_2 \qquad \text{V}$$

or a mixture of at least two different compounds having the formula V, and optionally about 0.05 to about 2 equivalents of a compound having the formula VI $$CH_2=CH—O—R^5 \qquad \text{VI}$$

or a mixture of two different compounds having the formula VI, in the presence of a catalyst. The catalyst is selected from the group consisting of free-radical catalysts, ionic catalysts and ultraviolet light. Preferably the catalyst is a free-radical catalyst such as an azo compound.

According to a second preferred embodiment, a polythioether of the invention is produced by reacting (n) equivalents of a compound having the formula IV, or a mixture of at least two different compounds having the formula IV, with (n+1) equivalents of a compound having the formula V, or a mixture of at least two different compounds having the formula V, optionally together with 0.05 to about 2 equivalents of a compound having the formula VII $$HS—R^5 \qquad \text{VII}$$

or a mixture of two different compounds having the formula VII, in the presence of a catalyst as described above.

Analogous methods for producing polyfunctional polythioethers using the foregoing reactants together with appropriate polyfunctionalizing agents are also provided.

Polythioethers produced by the foregoing methods are also provided.

In accordance with yet another aspect of the present invention, there is provided a polymerizable composition comprising (i) about 30 to about 90 wt % of at least one polythioether as defined herein, said at least one polythioether having a glass transition temperature not greater than −55° C., (ii) a curing agent in an amount from about 90 to about 150% of stoichiometric based on the amount of said at least one polythioether, and (iii) about 5 to about 60 wt % of a filler, with all wt % being based on the total weight of non-volatile components of the composition. The inventive composition is curable at a temperature of 0° C. or higher, preferably at a temperature of −20° C. or higher.

In accordance with an additional aspect of the present invention, there is provided a polymerizable composition comprising (i) about 30 to about 90 wt % of at least one polythioether as defined herein, said at least one polythioether having a glass transition temperature not greater than −50° C., (ii) a curing agent in an amount from about 90 to about 150% of stoichiometric based on the amount of said at least one polythioether, (iii) a plasticizer in an amount from about 1 to about 40 wt %, and (iv) a filler in an amount from about 5 to about 60 wt %, with all wt % being based on the total weight of non-volatile components of the composition. The composition is curable at a temperature of 0° C. or higher, preferably at a temperature of −20° C. or higher.

Cured polymeric materials prepared by polymerization of the foregoing compositions are also provided.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

It has surprisingly been discovered that the combination of certain polythiols with oxygenated dienes according to the present invention results in polythioether polymers that are liquids at room temperature and pressure and that have desirable physical and rheological properties, and that furthermore are substantially free of malodorous cyclic by-products. The inventive materials are also substantially free of deleterious catalyst residues, and hence have superior thermal resistance properties.

According to the present invention, polythioethers are provided that are liquid at room temperature and pressure and have excellent low temperature flexibility (low $T_g$) and fuel resistance. As used herein, the term "room temperature and pressure" denotes approximately 77° F. (25° C.), and 1 atmosphere.

In their most general aspect, the inventive polythioethers include a structure having the formula I wherein $R^1$ denotes a divalent $C_{2-6}$ n-alkyl, $C_{3-6}$ branched alkyl, $C_{6-8}$ cycloalkyl or $C_{6-10}$ alkylcycloalkyl group, —[(—CH$_2$—)$_p$—X—]$_q$—(—CH$_2$—)$_r$—, or —[(—CH$_2$—)$_p$—X—]$_q$—(—CH$_2$—)$_r$— in which at least one —CH$_2$— unit is substituted with a methyl group, $R^2$ denotes methylene, a divalent $C_{2-6}$ n-alkyl, $C_{2-6}$ branched alkyl, $C_{6-8}$ cycloalkyl or $C_{6-10}$ alkylcycloalkyl group, or —[(—CH$_2$—)$_p$—X—]$_q$—(—CH$_2$—)$_r$—, X denotes one selected from the group consisting of O, S and —NR$^6$—, $R^6$ denotes H or methyl, m is a rational number from 0 to 10, n is an integer from 1 to 60, p is an integer from 2 to 6, q is an integer from 1 to 5, and r is an integer from 2 to 10.

Preferably, a polythioether polymer according to the invention has a glass transition temperature $T_g$ that is not higher than −50° C. More preferably, the $T_g$ of the inventive polymer is not higher than −55° C. Very preferably, the $T_g$ of the inventive polymer is not higher than −60° C. Low $T_g$ is indicative of good low temperature flexibility, which can be determined by known methods, for example, by the methods described in AMS (Aerospace Material Specification) 3267 §4.5.4.7, MIL-S (Military Specification)-8802E §3.3.12 and MIL-S-29574, and by methods similar to those described in ASTM (American Society for Testing and Materials) D522-88.

The polythioethers of the invention exhibit very desirable fuel resistance characteristics when cured. One measure of the fuel resistance of the inventive polymers is their percent volume swell after prolonged exposure to a hydrocarbon fuel, which can be quantitatively determined using methods similar to those described in ASTM D792 or AMS 3269. Thus, in a preferred embodiment, the inventive polymers have, when cured, a percent volume swell not greater than 25% after immersion for one week at 140° F. (60° C.) and ambient pressure in jet reference fluid (JRF) type 1. Very preferably, the percent volume swell of the cured polymers is not greater than 20%.

JRF type 1, as employed herein for determination of fuel resistance, has the following composition (see AMS 2629, issued Jul. 1, 1989), section 3.1.1 et seq., available from SAE (Society of Automotive Engineers, Warrendale, Pa.):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 9.005% by volume |
| Tertiary butyl mercaptan | 0.015% ± 0.001 5 by weight of the other four components |

Desirably, the inventive polythioethers have number average molecular weights ranging from about 500 to 20,000, preferably about 1,000 to 10,000, very preferably about 2,000 to 5,000.

Liquid polythioether polymers within the scope of the present invention can be difunctional, that is, linear polymers having two end groups, or polyfunctional, that is, branched polymers having three or more end groups. Depending on the relative amounts of dithiol(s) and divinyl ether(s) used to prepare the polymers, the polymers can have terminal thiol groups (—SH) or terminal vinyl groups (—CH=CH$_2$). Furthermore, the polymers can be uncapped, that is, include thiol or vinyl terminal groups that are not further reacted, or capped, that is, include thiol or vinyl groups that are further reacted with other compounds. Capping the polythioethers of the invention enables introduction of additional terminal functionalities, for example, hydroxyl or amine groups, to the inventive polymers, or in the alternative, introduction of end groups that resist further reaction, such as terminal alkyl groups.

A first preferred embodiment of the inventive polythioethers has the formula II wherein A denotes a structure having the formula I, y is 0 or 1, $R^3$ denotes a single bond when y=0 and —S—(CH$_2$)$_2$—[—O—R$^2$]$_m$—O— when y=1,

$R^4$ denotes —SH or —S—(—CH$_2$—)$_2$—O—R$^5$ when y=0 and —CH$_2$=CH$_2$ or —(CH$_2$—)$_2$—S—R$^5$ when y=1, $R^5$ denotes $C_{1-6}$ n-alkyl which is unsubstituted or substituted with at least one —OH or —NHR$^7$ group, and $R^7$ denotes H or a $C_{1-6}$ n-alkyl group.

Thus, polythioethers of the formula II are linear, difunctional polymers which can be uncapped or capped. When y=0, the polymer includes terminal thiol groups or capped derivatives thereof. When y=1, the polymer includes terminal vinyl groups or capped derivatives thereof.

According to one preferred embodiment, the inventive polythioether is a difunctional thiol-terminated (uncapped) polythioether. That is, in formula II, y=0 and $R^4$ is —SH. Thus, the polythioether has the following structure:

The foregoing polymers are produced, for example, by reacting a divinyl ether or mixture thereof with an excess of a dithiol or mixture thereof, as discussed in detail below.

In a more particular preferred embodiment of the foregoing polythioether, when m=1 and $R^2$=n-butyl in formula II, $R^1$ is not ethyl or n-propyl. Also preferably, when m=1, p=2, q=2, r=2 and $R^2$=ethyl, X is not O.

According to another preferred embodiment, the inventive polythioether is a capped polymer in which the foregoing terminal —SH groups are replaced by —S—(—CH$_2$—)$_2$—O—$R^5$. Such caps are produced by reaction of the terminal thiol group with a monovinyl ether, for example by including in the reaction mixture a capping agent or mixture thereof, as discussed in detail below.

In the foregoing, $R^5$ denotes an unsubstituted or substituted alkyl group, preferably a $C_{1-6}$ n-alkyl group which is unsubstituted or substituted with at least one —OH or —NHR$^7$ group, with $R^7$ denoting H or $C_{1-6}$ n-alkyl. Exemplary useful $R^5$ groups include alkyl groups, such as ethyl, propyl and butyl; hydroxyl-substituted groups such as 4-hydroxybutyl; amine-substituted groups such as 3-aminopropyl; etc.

Polythioethers according to the invention also include difunctional vinyl-terminated (uncapped) polythioethers. That is, in formula II, y=1 and $R^4$ is —CH=CH$_2$. These polymers are produced, for example, by reacting a dithiol or mixture thereof with an excess of a divinyl ether or mixture thereof, as discussed in detali below. Analogous capped polythioethers include terminal —(CH$_2$—)$_2$—S—R$^5$.

The foregoing polythioethers are linear polymers having a functionality of 2 (considering alkyl and other non-reactive caps within this total). Polythioethers having higher functionality are also within the scope of the present invention. Such polymers are prepared, as discussed in detail below, by using a polyfunctionalizing agent. The term "polyfunctionalizing agent" as employed herein denotes a compound having more than two moieties that are reactive with terminal —SH and/or —CH=CH$_2$ groups. The polyfunctionalizing agent preferably includes from 3 to 6 such moieties, and thus is denoted a "z-valent" polyfunctionalizing agent, where z is the number (preferably from 3 to 6) of such moieties included in the agent, and hence the number of separate branches which the polyfunctional polythioether comprises. The polyfunctionalizing agent can be represented by the formula where $R^8$ denotes a moiety that is reactive with terminal —SH or —CH=CH$_2$ and can be the same or different, and B is the z-valent residue of the polyfunctionalizing agent, i.e., the portion of the agent other than the reactive moieties $R^7$.

Polyfunctional polythioethers according to the present invention thus preferably have the formula III

III wherein
A denotes a structure having the formula I,
y is 0 or 1,
$R^3$ denotes a single bond when y=0
and —S—(CH$_2$)$_2$—[—O—R$^2$—]$_m$—O— when y=1,
$R^4$ denotes —SH or —S—(—CH$_2$—)$_2$—O—R$^5$ when y=0
and —CH$_2$=CH$_2$ or —(CH$_2$—)$_2$—S—R$^5$ when y=1,
$R^5$ denotes $C_{1-6}$ n-alkyl which is unsubstituted or substituted with at least one —OH or —NHR$^7$ group,
$R^7$ denotes H or a $C_{1-6}$ n-alkyl group,
z is an integer from 3 to 6, and
B denotes a z-valent residue of a polyfunctionalizing agent.

As with the preceding difunctional embodiments, the foregoing polyfunctional polythioethers of the present invention can include terminal —SH or —CH=CH$_2$ groups, or can be capped and thus include terminal —S—(—CH$_2$—)$_2$—O—R$^5$ or —(CH$_2$—)$_2$—S—R$^5$ groups. Partially capped polyfunctional polymers, i.e., polymers in which some but not all of the branches are capped, are also within the scope of the present invention.

Specific polyfunctionalizing agents include trifunctionalizing agents, that is, compounds with z=3. Preferred trifunctionalizing agents include triallylcyanurate (TAC), which is reactive with compounds of the formula II ($R^8$=allyl), and 1,2,3-propanetrithiol, which is reactive with compounds of the formula III ($R^8$=—SH) Agents having mixed functionality, i.e., agents that include moieties (typically separate moieties) that react with both thiol and vinyl groups, can also be employed.

Other useful polyfunctionalizing agents include trimethylolpropane trivinyl ether, and the polythiols described in U.S. Pat. No. 4,366,307, U.S. Pat. No. 4,609, 762 and U.S. Pat. No. 5,225,472, the disclosures of each of which are incorporated in their entireties herein by reference.

Polyfunctionalizing agents having more than three reactive moieties (i.e., z>3) afford "star" polythioethers and hyperbranched polythioethers. For example, two equivalents of TAC can be reacted with one mole of a dithiol to afford a material having an average functionality of 4. This material can then be reacted with a divinyl ether and a dithiol to yield a polymer, which can in turn be mixed with a trifunctionalizing agent to afford a polymer blend having an average functionality between 3 and 4.

Polythioethers as described above have a wide range of average functionality. For example, trifunctionalizing agents afford average functionalities from about 2.05 to 3.0, preferably about 2.1 to 2.6. Wider ranges of average functionality can be achieved by using quaternary or higher polyfunctionalizing agents. Functionality will also be affected by factors such as stoichiometry, as is known to those skilled in the art.

Methods of making the foregoing polyfunctional polythioethers are discussed in detail below.

Polythioethers within the scope of the present invention are prepared by a number of methods. According to a first preferred method, (n+1) equivalents of a compound having the formula IV

IV or a mixture of at least two different compounds having the formula IV, are reacted with n equivalents of a compound having the formula V

V or a mixture of at least two different compounds having the formula V, in the presence of a catalyst. In formulas IV and V above, $R^1$, $R^2$ and all indices are defined as in formula I. This method affords an uncapped, thiol-terminated difunctional polythioether.

The compounds of formula IV are dithiol compounds. Preferred dithiols include those compounds in which $R^1$ is a divalent $C_{2-6}$ n-alkyl group, i.e., 1,2-ethanedithiol, 1,3-propanedithiol, 1,4-butanedithiol, 1,5-pentanedithiol or 1,6-hexanedithiol.

Additional preferred dithiols include those compounds in which $R^1$ is a divalent $C_{3-6}$ branched alkyl group, having one or more pendent groups which can be, for example, methyl or ethyl groups. Preferred compounds having branched alkyl $R^1$ include 1,2-propanedithiol, 1,3-butanedithiol, 2,3-butanedithiol, 1,3-pentanedithiol, 1,3-dithio-3-methylbutane and 2,3-butanedithiol. Other useful dithiols include those in which $R^1$ is a divalent $C_{6-8}$ cycloalkyl or $C_{6-10}$ alkylcycloalkyl group, for example, dipentenedimercaptan and ethylcyclohexyldithiol (ECHDT).

Further preferred dithiols include one or more heteroatom substituents in the carbon backbone, that is, dithiols in which X is a heteroatom such as O, S or another bivalent heteroatom radical; a secondary or tertiary amine group, i.e., —$NR^6$—, where $R^6$ is hydrogen or methyl; or another substituted trivalent heteroatom. In a preferred embodiment, X is O or S, and thus $R^1$ is —$[(-CH_2-)_p-O-]_q-(-CH_2-)_r-$ or —$[(-CH_2-)_p-S-]_q-(-CH_2-)_r-$. Preferably, the indices p and r are equal, and very preferably both have the value of 2. Particularly preferred exemplary dithiols of this type include dimercaptodiethylsulfide (DMDS) (p, r=2, q=1, X=S); dimercaptodioxaoctane (DMDO) (p, q, r=2, X=O); and 1,5-dithio-3-oxapentane. It is also possible to employ dithiols that include both heteroatom substituents in the carbon backbone and pendent alkyl, in particular methyl, groups. Such compounds include methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS such as HS—$CH_2CH(CH_3)$—S—$CH(CH_3)CH_2$—SH and HS—$CH(CH_3)CH_2$—S—$CH_2CH(CH_3)$—SH.

Two or more different dithiols of formula IV can also be employed if desired in preparing polythioethers according to the invention.

The compounds of formula V are divinyl ethers. Divinyl ether itself (m=0) can be used. Preferred divinyl ethers include those compounds having at least one alkoxy group, more preferably from 1 to 4 alkoxy groups (i.e., those compounds in which m is an integer from 1 to 4). Very preferably, m is an integer from 2 to 4. It is also possible to employ commercially available divinyl ether mixtures in producing polythioethers according to the invention. Such mixtures are characterized by a non-integral average value for the number of alkoxy units per molecule. Thus, m in formula V can also take on non-integral, rational values between 0 and 10, preferably between 1 and 10, very preferably between 1 and 4, particularly between 2 and 4.

Exemplary divinyl ethers include those compounds in which $R^2$ is $C_{2-6}$ n-alkyl or $C_{2-6}$ branched alkyl. Preferred divinyl ethers of this type include ethylene glycol divinyl ether (EG-DVE) ($R^2$=ethyl, m=1); butanediol divinyl ether (BD-DVE) ($R^2$=butyl, m=1); hexanediol divinyl ether (HD-DVE) ($R^2$=hexyl, m=1); diethylene glycol divinyl ether (DEG-DVE) ($R^2$=ethyl, m=2); triethylene glycol divinyl ether ($R^2$=ethyl, m=3); and tetraethylene glycol divinyl ether ($R^2$=ethyl, m=4). Useful divinyl ether blends include "PLURIOL®" type blends such as PLURIOL® E-200 divinyl ether (commercially available from BASF), for which $R^2$=ethyl and m=3.8, as well as "DPE" polymeric blends such as DPE-2 and DPE-3 (commercially available from International Specialty Products, Wayne, N.J.). Of these, DEG-DVE and PLURIOL® E-200 are particularly preferred.

Useful divinyl ethers in which $R^2$ is $C_{2-6}$ branched alkyl can be prepared by reacting a polyhydroxy compound with acetylene. Exemplary compounds of this type include compounds in which $R^2$ is an alkyl-substituted methylene group such as —$CH(CH_3)$— or —$CH_2CH(CH_3)$—.

Other useful divinyl ethers include compounds in which $R^2$ is polytetrahydrofuryl (poly-THF) or polyoxyalkylene, preferably having an average of about 3 monomer units.

Two or more compounds of the formula V can be used in the foregoing method. Thus in preferred embodiments of the invention, two compounds of formula IV and one compound of formula V, one compound of formula IV and two compounds of formula V, two compounds of formula IV and of formula V, and more than two compounds of one or both formulas, can be used to produce a variety of polythioethers according to the invention, and all such combinations of compounds are contemplated as being within the scope of the invention.

Although, as indicated above, compounds of the formulas IV and V which have pendent alkyl groups, for example pendent methyl groups, are useful according to the invention, it has surprisingly been discovered that compounds of the formulas IV and V which are free of pendent methyl or other alkyl groups also afford polythioethers that are liquid at room temperature and pressure.

The reaction between the compounds of formulas IV and V is preferably catalyzed by a free radical catalyst. Preferred free radical catalysts include azo compounds, for example azobisnitrile compounds such as azo(bis)isobutyronitrile (AIBN); organic peroxides such as benzoyl peroxide and t-butyl peroxide; and inorganic peroxides such as hydrogen peroxide. The reaction can also be effected by irradiation with ultraviolet light either with or without a cationic photoinitiating moiety. Ionic catalysis methods, using either inorganic or organic bases, e.g., triethylamine, also yield materials useful in the context of this invention.

Capped analogs to the foregoing polythioethers can be prepared by reacting (n+1) equivalents of a compound having the formula IV or a mixture of at least two different compounds having the formula IV, (n) equivalents of a compound having the formula V or a mixture of at least two different compounds having the formula V, and about 0.05 to about 2 equivalents of a compound having the formula VI

VI or a mixture of two different compounds having the formula VI, in the presence of an appropriate catalyst.

Compounds of the formula VI are monovinyl ethers, which react with terminal thiol groups to cap the polythioether polymer. Preferred monovinyl ethers of the formula VI include amino- and hydroxyalkyl vinyl ethers, such as 3-aminopropyl vinyl ether and 4-hydroxybutyl vinyl ether (butanediol monovinyl ether), as well as unsubstituted alkyl vinyl ethers such as ethyl vinyl ether. Use of 2 equivalents of compounds of the formula VI affords fully capped polymers, while use of lesser amounts results in partially capped polymers.

According to another preferred method, (n) equivalents of a compound having the formula IV, or a mixture of at least two different compounds having the formula IV, are reacted with (n+1) eqivalents of a compound having the formula V, or a mixture of at least two different compounds having the formula V, again in the presence of an appropriate catalyst. This method affords an uncapped, vinyl-terminated difunctional polythioether.

Capped analogs to the foregoing vinyl-terminated polythioethers can be prepared by reacting (n+1) equivalents of a compound having the formula V or a mixture of at least two different compounds having the formula V, (n) equivalents of a compound having the formula IV or a mixture of at least two different compounds having the formula IV, and about 0.05 to about 2 equivalents of a compound having the formula VII

VII or a mixture of two different compounds having the formula VII, in the presence of an appropriate catalyst.

Compounds of the formula VII are monothiols, which can be unsubstituted or substituted with, e.g., hydroxyl or amino groups. Exemplary capping compounds of the formula VII include mercaptoalcohols such as 3-mercaptopropanol, and mercaptoamines such as 4-mercaptobutylamine.

Polyfunctional analogs of the foregoing difunctional polythioethers are similarly prepared by combining one or more compounds of formula IV and one or more compounds of formula V, in appropriate amounts, with a polyfunctionalizing agent as described above, and reacting the mixture. Thus, according to one method for making polyfunctional polythioethers of the present invention, (n+1) equivalents a compound or compounds having the formula IV, (n) equivalents of a compound or compounds having the formula V, and a z-valent polyfunctionalizing agent, are combined to form a reaction mixture. The mixture is then reacted in the presence of a suitable catalyst as described above to afford thiol-terminated polyfunctional polythioethers. Capped analogs of the foregoing polythioethers are prepared by inclusion in the starting reaction mixture of about 0.05 to about (z) equivalents one or more appropriate capping compounds VI. Use of (z) equivalents affords fully capped polyfunctional polymers, while use of lesser amounts again yields partially capped polymers.

Similarly, (n) equivalents a compound or compounds having the formula IV, (n+1) equivalents of a compound or compounds having the formula V, and a z-valent polyfunctionalizing agent, are combined to form a reaction mixture and reacted as above to afford vinyl-terminated polyfunctional polythioethers. Capped analogs of the foregoing polythioethers are prepared by inclusion in the starting reaction mixture of one or more appropriate capping compounds VII.

The inventive polythioethers preferably are prepared by combining at least one compound of formula IV and at least one compound of formula V, optionally together with one or capping compounds VI and/or VII as appropriate, and/or a polyfunctionalizing agent, followed by addition of an appropriate catalyst, and carrying out the reaction at a temperature from about 30 to about 120° C. for a time from about 2 to about 24 hours. Very preferably the reaction is carried out at a temperature from about 70 to about 90° C. for a time from about 2 to about 6 hours.

Since the inventive reaction is an addition reaction, rather than a condensation reaction, the reaction typically proceeds substantially to completion, i.e., the inventive polythioethers are produced in yields of approximately 100%. No or substantially no undesirable by-products are produced. In particular, the reaction does not produce appreciable amounts of malodorous cyclic by-products such as are characteristic of known methods for producing polythioethers. Moreover, the polythioethers prepared according to the invention are substantially free of residual catalyst. As a result, no free catalyst is available to further react with the polythioether, in particular in the presence of water at room temperature, to degrade the polymer and produce malodorous cyclic compounds. Thus, the inventive polythioethers are characterized both by thermal stability and by low odor.

Polythioethers according to the invention are useful in applications such as coatings and sealant compositions, and preferably are formulated as polymerizable sealant compositions in applications where low temperature flexibility and fuel resistance are important. Such sealant compositions are useful, e.g., as aerospace sealants and linings for fuel tanks. A first preferred polymerizable composition thus includes at least one polythioether as described herein; a curing agent or combination of curing agents; and a filler.

The polythioether or combination of polythioethers preferably is present in the polymerizable composition in an amount from about 30 wt % to about 90 wt %, more preferably about 40 to about 80 wt %, very preferably about 45 to about 75 wt %, with the wt % being calculated based on the weight of all non-volatile components of the composition. Preferably, the $T_g$ of the polythioether(s) used in the polymerizable composition is not higher than −55° C., more preferably not higher than −60° C.

Curing agents useful in polymerizable compositions of the invention include epoxy resins, for example, hydantoin diepoxide, diglycidyl ether of bisphenol-A epoxides, diglycidyl ether of bisphenol-F epoxides, Novolak type epoxides, and any of the epoxidized unsaturated and phenolic resins. Other useful curing agents include unsaturated compounds such as acrylic and methacrylic esters of commercially available polyols, unsaturated synthetic or naturally occurring resin compounds, TAC, and olefinic terminated derivatives of the compounds of the present invention. In addition, useful cures can be obtained through oxidative coupling of the thiol groups using organic and inorganic peroxides (e.g., $MnO_2$) known to those skilled in the art. Selection of the particular curing agent may affect the $T_g$ of the cured composition. For example, curing agents that have a $T_g$ significantly lower than the $T_g$ of the polythioether may lower the $T_g$ of the cured composition.

Depending on the nature of the polythioether(s) used in the composition, the composition will contain about 90% to about 150% of the stoichiometric amount, preferably about 95 to about 125%, of the selected curing agent(s).

Fillers useful in the polymerizable compositions of the invention include those commonly used in the art, such as carbon black and calcium carbonate ($CaCO_3$). Preferably, the compositions include about 5 to about 60 wt % of the selected filler or combination of fillers, very preferably about 10 to 50 wt %.

The polythioethers, curing agents and fillers employed in polymerizable compositions of the invention, as well as optional additives as described below, should be selected so as to be compatible with each other. Selection of compatible ingredients for the inventive compositions can readily be performed by those skilled in the art without recourse to undue experimentation.

The foregoing polymerizable compositions preferably are curable at a minimum temperature of about 0° C. (i.e., at a temperature of about 0° C. or higher), more preferably about −10° C., very preferably about −20° C., and have a $T_g$ when cured not higher than about −55° C., more preferably not higher than −60° C., very preferably not higher than −65° C. When cured, the polymerizable compositions preferably have a % volume swell not greater than 25%, more preferably not greater than 20%, after immersion for one week at 60° C. (140° F.) and ambient pressure in jet reference fluid (JRF) type 1.

In addition to the foregoing ingredients, polymerizable compositions of the invention can optionally include one or more of the following: pigments; thixotropes; accelerators; retardants; adhesion promoters; and masking agents.

Useful pigments include those conventional in the art, such as carbon black and metal oxides. Pigments preferably are present in an amount from about 0.1 to about 10 wt %.

Thixotropes, for example silica, are preferably used in an amount from about 0.1 to about 5 wt %.

Accelerators known to the art, such as amines, preferably are present in an amount from about 0.1 to about 5 wt %. Two such useful accelerators are 1,4-diaza-bicyclo[2.2.2] octane (DABCO®, commercially available from Air Products, Chemical Additives Division, Allentown, Pa.) and DMP-30® (an accelerant composition including 2,4,6-tri (dimethylaminomethyl)phenol, commercially available from Rohm and Haas. Philadelphia, Pa.).

Retardants, such as stearic acid, likewise preferably are used in an amount from about 0.1 to about 5 wt %. Adhesion promoters, which can be, for example, conventional phenolics or silanes, if employed are preferably present in amount from about 0.1 to about 5 wt %. Masking agents, such as pine fragrance or other scents, which are useful in covering any low level odor of the composition, are preferably present in an amount from about 0.1 to about 1 wt %.

An additional advantage of sealant compositions according to the invention is their improved curing behavior. The extent of cure of a sealant composition as a function of time is often difficult to measure directly, but can be estimated by determining the extrusion rate of the composition as a function of time. The extrusion rate is the rate at which a mixed sealant composition, i.e., a sealant composition together with an accelerator system, is extruded from an applicator device. Since the sealant composition is mixed with the accelerator system, curing begins, and the extrusion rate changes with time. The extrusion rate thus is inversely related to the extent of cure. That is, when the extent of cure is low, the viscosity of the mixed sealant composition is low and thus the extrusion rate is high. When the reaction approaches completion, the viscosity becomes very high, and the extrusion rate thus becomes low.

Figure 1:
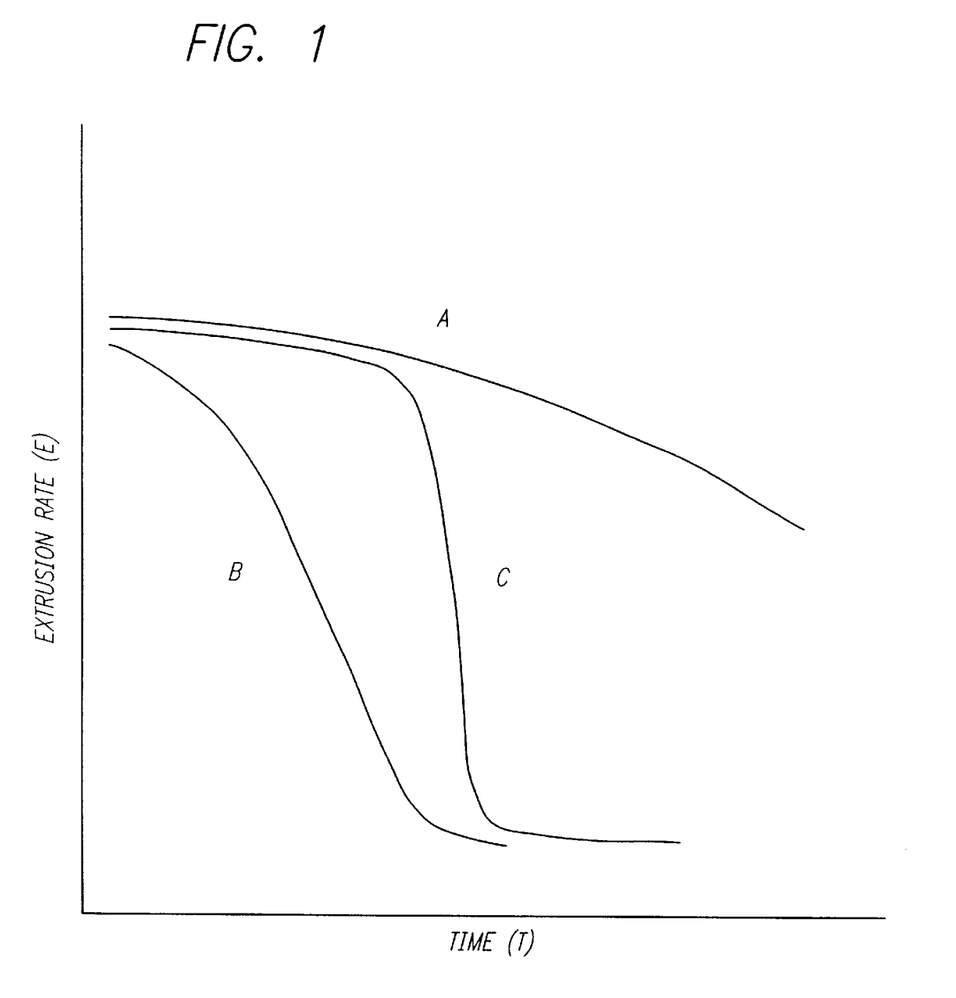
FIG. 1 depicts linear graphs of extrusion rate (E) versus time (T) for sealant compositions of the invention in comparison to extrusion rate curves for known types of sealant composition.

With reference to FIG. 1, the viscosity of some known types sealant compositions remains low for an extended time, because the compositions are slow to cure. Such compositions have extrusion curves qualitatively similar to curve A. Other known types of sealant composition cure very quickly, and thus their viscosity rapidly increases. Consequently, the extrusion rate rapidly decreases, as shown in curve B. Desirably, a mixed sealant composition should have a low viscosity, and thus a high extrusion rate, for a length of time sufficient to allow even application of the sealant composition to the area requiring sealing, but then should cure rapidly after application, i.e., their extrusion rate should quickly decrease. Sealant compositions according to the present invention are characterized by this desirable extrusion curve, as illustrated qualitatively in curve C.

Sealant compositions according to the present invention can have, depending on the particular formulation, initial extrusion rates as high as 500 g/min or higher, together with low extrusion rates on the order of about 5 to 10 g/min or less after curing times on the order of one hour.

Figure 2:
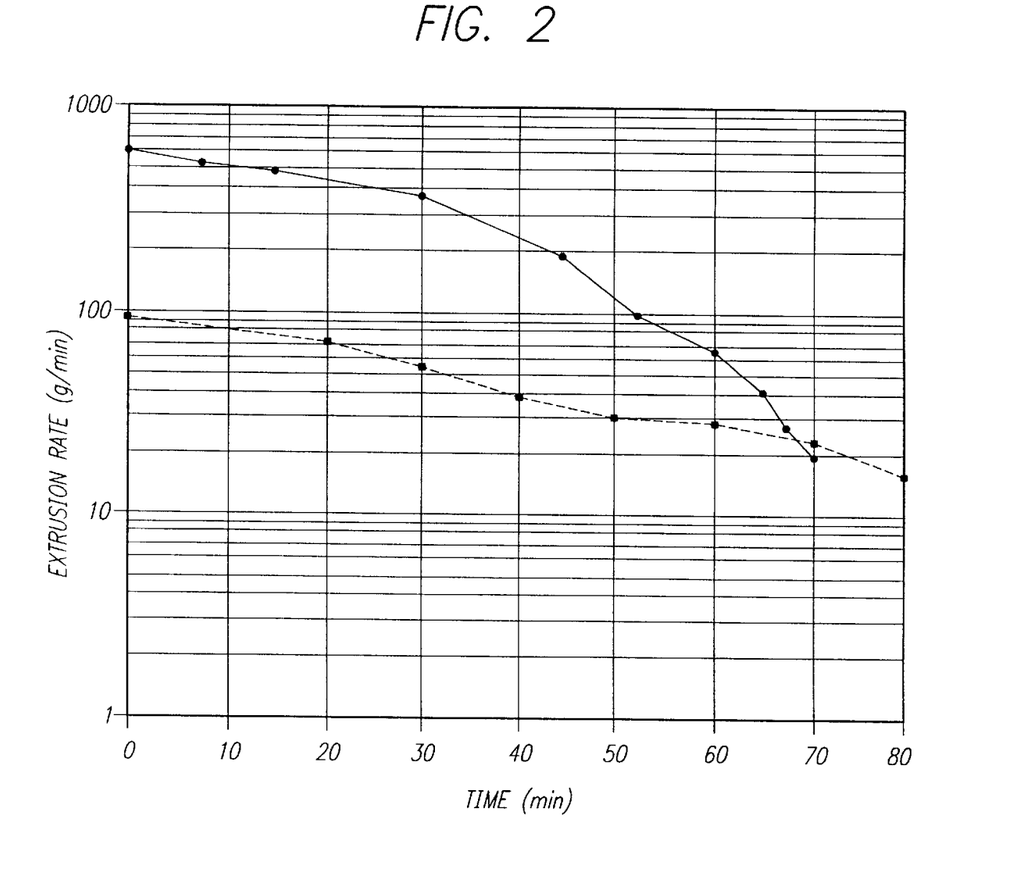
FIG. 2 is a semi-log graph of the extrusion rate curve of a polythioether of the invention (♦) and a prior art polysulfide (■).

As shown in FIG. 2, the initial extrusion rate of a polymer of the present invention (Example 1, below, cured with an epoxy curing agent as described below) is about 550 g/min, then falls rapidly to about 20 g/min after 70 minutes. In comparison, a known polysulfide (cured with $MnO_2$) has an initial extrusion rate of about 90 g/min, which slowly falls to about 20 g/min after 70 minutes.

A second preferred polymerizable composition combines one or more plasticizers with the polythioether(s), curing agent(s) and filler(s) described above. Use of a plasticizer allows the polymerizable composition to include polythioethers which have higher $T_g$ than would ordinarily be useful in an aerospace sealant. That is, use of a plasticizer effectively reduces the $T_g$ of the composition, and thus increases the low-temperature flexibility of the cured polymerizable composition beyond that which would be expected on the basis of the $T_g$ of the polythioethers alone.

Plasticizers that are useful in polymerizable compositions of the invention include phthalate esters, chlorinated paraffins, hydrogenated terphenyls, etc. The plasticizer or combination of plasticizers preferably constitute 1 to about 40 wt %, more preferably 1 to about 10 wt % of the composition.

Depending on the nature and amount of the plasticizers) used in the composition, polythioethers of the invention which have $T_g$ values up to about −50° C., preferably up to about −55° C., can be used.

The foregoing polymerizable compositions also preferably are curable at a minimum temperature of about 0° C., more preferably about −10° C., very preferably about −20° C.

The present invention is illustrated in more detail by means of the following non-limiting examples.

In examples 1–8, liquid polythioethers were prepared by stirring together one or more dithiols with one or more divinyl ethers and a trifunctionalizing agent. The reaction mixture was then heated and a free radical catalyst was added. All reactions proceeded substantially to completion (approximately 100% yield).

EXAMPLE 1

In a 2 L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the heated reaction mixture was added 4.6 g (0.024 mol) of an azobisnitrile free radical catalyst (VAZO® 67 [2,2'-azobis (2-methylbutyronitrile), commercially available from DuPont.). The reaction proceeded substantially to completion after 2 hours to afford 1250 g (0.39 mol, yield 100%) of a liquid polythioether resin having a $T_g$ of −68° C. and a viscosity of 65 poise. The resin was faintly yellow and had low odor.

EXAMPLE 2

In a 1 L flask, 404.4 g (1.60 mol) of PLURIOL® E-200 divinyl ether and 355.88 g (1.94 mol) of DMDO were mixed with 12.1 g (0.049 mol) of TAC and reacted as in Example 1. The reaction proceeded substantially to completion after 5 hours to afford 772 g (0.024 mol, yield 100%) of a resin having a $T_g$ of −66° C. and a viscosity of 48 poise. The resin was yellow and had low odor.

EXAMPLE 3

In a 100 mL flask, 33.2 g (0.21 mol) of DEG-DVE and 26.48 g (0.244 mol) of 1,2-propanedithiol were mixed with 0.75 g (0.003 mol) of TAC and heated to 71° C. To the heated reaction mixture was added 0.15 g (0.8 mmol) of VAZO® 67. The reaction proceeded substantially to completion after 7 hours to afford 60 g (0.03 mol, yield 100%) of a resin having a $T_g$ of −61° C. and a viscosity of 22 poise. The resin had a noticeable PDT odor.

EXAMPLE 4

In a 100 mL flask, 33.3 g (0.136 mol) of tripropylene glycol divinyl ether (DPE-3) and 27.0 g (0.170 mol) of dimercaptodimethylsulfide (DMDS) were mixed with 0.69 g (0.003 mol) of TAC and heated to 77° C. To the heated reaction mixture was added 0.15 g (0.8 mmol) of VAZO® 67. The reaction proceeded substantially to completion after 6 hours to afford 61 g (0.028 mol, yield 100%) of a resin having a $T_g$ of −63° C. and a viscosity of 26 poise.

EXAMPLE 5

In a 250 mL flask, 113.01 g (0.447 mol) of PLURIOL® E-200 divinyl ether and 91.43 g (0.498 mol) of DMDO were mixed with 1.83 g (0.013 mol) of 1,2,3-propanetrithiol (PTT) and allowed to react exothermically for 72 hours. The mixture was then heated to 80° C. To the heated reaction mixture was added 0.2 g (1 mmol) of VAZO® 67. The reaction mixture was maintained at 80° C., and the reaction proceeded substantially to completion after 3 hours to afford 200 g (0.06 mol, yield 100%) of a resin having a $T_g$ of −66° C. and a viscosity of 55 poise.

EXAMPLE 6

In a small jar, 14.0 g (0.055 mol) of PLURIOL® E-200 divinyl ether, 6.16 g (0.336 mol) of DMDO and 5.38 g (0.336 mol) of DMDS were mixed with 0.42 g (0.017 mol) of TAC (briefly heated to melt the TAC) and heated to 82° C. To the heated reaction mixture was added 0.2 g (0.001 mol) of VAZO® 67. The reaction proceeded substantially to completion after 18 hours to afford 26 g (8.4 mmol, yield 100%) of a resin having a $T_g$ of −63° C. and a viscosity of 80 poise.

EXAMPLE 7

In a small jar, 13.55 g (0.054 mol) of PLURIOL® E-200 divinyl ether, 10.44 g (0.057 mol) of DMDO and 1.44 g (8.1 mmol) of ethylcyclohexanedithiol (ECHDT) were mixed with 0.40 g (1.6 mmol) of TAC (heated briefly to melt the TAC) and heated to 82° C. To the heated reaction mixture was added 0.2 g (0.001 mol) of VAZO® 67. The reaction proceeded substantially to completion after 5 hours to afford 26 g (8.1 mmol, yield 100%) of a resin having a $T_g$ of −66° C. and a viscosity of 58 poise.

EXAMPLE 8

In a small glass jar, 9.11 g (0.036 mol) of PLURIOL® E-200 divinyl ether, 5.71 g (0.031 mol) of DMDO, 1.52 g (7.8 mmol) of ECHDT, 5.08 g (0.031 mol) of DMDS and 4.11 g (0.024 mol) of hexanediol divinyl ether (HD-DVE) were mixed with 0.39 g (1.6 mmol) of TAC (heated briefly to dissolve the TAC) and heated to 82° C. To the heated reaction mixture was added 0.6 g (3.1 mmol) of VAZO® 67. The reaction proceeded substantially to completion after about 45 hours to afford 2.6 g (7.8 mmol, yield 100%) of a resin having a $T_g$ of −66° C. and a viscosity of 304 poise. The resin had a cloudy appearance.

Each of the foregoing resins was evaluated for odor. The following scale was employed: 3: strong, offensive odor; 2: moderate odor; 1: slight odor; 0: substantially odorless.

The polymer described in Example 3 of U.S. Pat. No. 4,366,307 was used as a control. This polymer (the "control polymer") had an odor of 3.

Results were as follows:

| Polymer | Odor | Polymer | Odor |
|---|---|---|---|
| 1 | 1 | 5 | 1 |
| 2 | 1 | 6 | 1 |
| 3 | 3 | 7 | 1 |
| 4 | 1 | 8 | 2 |

All of the liquid polythioethers thus had little or moderate odor except polymer 3, which had a strong odor.

The resins prepared in Examples 1–8 were then cured. Curing was carried out using the uncompounded resins with a curing agent and DABCO accelerator. The curing agent had the following composition:

| | |
|---|---|
| epoxy novolak (equivalent weight 175.5) | 22 wt % |
| hydantoin epoxy (equivalent weight 132) | 34 wt % |
| calcium carbonate | 34 wt % |
| carbon black | 5 wt % |
| silane adhesive promoter | 5 wt % |

The cured resins were evaluated for odor according to the procedure set forth above. The $T_g$ and the percent weight gain after immersion in JRF type 1 for one week at room temperature and pressure were also measured for each of the cured resins. The volume swell and weight gain percentages were determined for each cured material as follows:

$w_1$=initial weight in air
$w_2$=initial weight in $H_2O$
$w_3$=final weight in air
$w_4$=final weight in $H_2O$
% volume swell=$100\times[(w_2+w_3)-(w_1+w_4)]/(w_1-w_2)$
% weight gain=$100\times(w_3-w_1)/w_1$ The results are given in Table 1:

TABLE 1

| | Cured Resin | | | | | | | |
|---|---|---|---|---|---|---|---|---|
| | 1 | 2 | 3 | 4 | 5 | 6 | 7 | 8 |
| Odor | 0 | 0 | 0 | 0 | 0 | 0 | 0 | 0 |
| $T_g$ (° C.) | −59 | −61 | −61 | −63 | −62 | −56 | −59 | −58 |
| % fuel swell | 19 | 22 | — | — | 23 | 19 | 24 | 27 |
| % wt gain | 14 | 15 | 15 | 23 | 15 | 15 | 19 | 20 |

In comparison, the control polymer had an odor of 1–2 when cured.

EXAMPLE 9

Polythioethers having a number average molecular weight of 2100 and an average functionality F of 2.1 were prepared by combining a divinyl ether with a dithiol as shown in Table 2 and reacting the materials as described herein. The uncompounded polythioethers were then cured using 15 g of the curing agent described above and 0.30 g of DABCO. For each polythioether so prepared, the following quantities were measured: viscosity (uncured material, poise p); Shore A hardness (cured material, Rex durometer value); % weight gain (cured material) after one week at 140° F. (60° C.) and atmospheric pressure in JRF type 1; and $T_g$ (uncured material, ° C.). Results were as follows:

TABLE 2

| divinyl ether | dithiol | | | |
|---|---|---|---|---|
| | ECHDT | DMDS | DMDO | HDT[d] |
| DEG-DVE | 145 p | (solid) | 27 p | 24 p |
| | 44 Rex | 94 Rex | 25 Rex | 25 Rex |
| | 27% | 3% | 14% | 29% |
| | −53 | −63 | −69 | −77 |
| PLURIOL ®[a] | 77 p | 41 p | 59 p | 25 p |
| | 43 Rex | 47 Rex | 27 Rex | 23 Rex |
| | 27% | 11% | 18% | 30% |
| | −57 | −61 | −67 | −76 |
| BD-DVE[b] | 185 p | (solid) | (solid) | (solid) |
| | 42 Rex | — | 20 Rex | 22 Rex |
| | 44% | — | 21% | 44% |
| | −59 | — | −79 | −85 |
| HD-DVE | 155 p | (solid) | (solid) | (soft solid) |
| | 50 Rex | — | 14 Rex | 29 Rex |

TABLE 2-continued

| divinyl ether | dithiol | | | |
|---|---|---|---|---|
| | ECHDT | DMDS | DMDO | HDT[d] |
| Poly-THF[c] | 57% | — | 27% | 68% |
| | −60 | −63 | −78 | −86 |
| | 91 p | (solid) | 27 p | — |
| | 30 Rex | 75 Rex | 17 Rex | — |
| | 64% | 29% | 37% | — |
| | −69 | −79 | −79 | — |

[a]PLURIOL® E-200 divinyl ether
[b]Butanediol divinyl ether
[c]Polytetrahydrofuran divinyl ether
[d]Hexanedithiol From the foregoing table it is apparent that the following combinations of divinyl ether and dithiol afford liquid polythioethers having unexpectedly superior fuel resistance and low temperature flexibility when cured: PLURIOL® E-200/DMDO; and DEG-DVE/DMDO. Other potentially useful combinations include DEG-DVE/ECHDT; DEG-DVE/HDT; PLURIOL® E-200/ECHDT; PLURIOL® E-200/HDT; and poly-THF/DMDO. PLURIOL® E-200/DMDS also has excellent fuel resistance and low temperature flexibility when cured, but the uncompounded material does not remain in a liquid state for an extended period of time.

EXAMPLE 10
Addition of DMDS to PLURIOL®/DMDO Polymers

Four liquid polythiols were prepared as described herein. The polymers had the following compositions (listed values are molar equivalents):

| | 1 | 2 | 3 | 4 |
|---|---|---|---|---|
| PLURIOL® E-200 | 6.6 | 6.6 | 6.6 | 6.6 |
| DMDO | 8 | 6 | 4.5 | 4 |
| DMDS | 0 | 2 | 3.5 | 4 |

Each uncompounded polymer was cured as in Example 9 (15 g of the curing agent composition and 0.30 g of DABCO), with the addition of 0.2 molar equivalents of TAC to afford polymers having a number average molecular weight of about 3000 and a functionality F of 2.2. For each polymer, the following properties were measured: $T_g$ (resin, ° C.); $T_g$ (cured, ° C.); viscosity (p); % swell in JRF type 1; % weight gain in JRF type 1; and % weight gain in water. Results are given in Table 3.

TABLE 3

| | 1 | 2 | 3 | 4 |
|---|---|---|---|---|
| $T_g$ (resin) | −67 | −66 | −64 | −63 |
| (cured) | −59 | −58 | −56 | −56 |
| Viscosity JRF | 59 | 53 | 62 | 80 |
| % Swell | 24 | 21 | 21 | 20 |
| % Wt Gain H₂O | 18 | 15 | 16 | 16 |
| % Wt Gain | 11.8 | 11.5 | 7.4 | 7.5 |

All of the foregoing polymers displayed excellent fuel resistance. Polymers 1 and 2 in particular also displayed excellent low temperature flexibility.

EXAMPLE 11
Addition of ECHDT to PLURIOL®/DMDO Polymers

Four liquid polythiols were prepared as described herein. The polymers had the following compositions (listed values are molar equivalents):

| | 1 | 2 | 3 | 4 |
|---|---|---|---|---|
| PLURIOL® E-200 | 6.6 | 6.6 | 6.6 | 6.6 |
| DMDO | 8 | 7 | 6 | 5 |
| ECHDT | 0 | 1 | 2 | 3 |

Each uncompounded polymer was cured as in Example 10 to afford polymers having a number average molecular weight of about 3000 and a functionality F of 2.2. For each polymer, the following properties were measured: $T_g$ (resin, ° C.); $T_g$ (cured, ° C.); viscosity (p); % swell in JRF type 1; % weight gain in JRF type 1; and % weight gain in water. Results are given in Table 4.

TABLE 4

| | 1 | 2 | 3 | 4 |
|---|---|---|---|---|
| $T_g$ (resin) | −67 | −66 | −65 | −64 |
| (cured) | −59 | −59 | −58 | −56 |
| Viscosity JRF type 1 | 59 | 36 | 44 | 50 |
| % Swell | 24 | 25 | 28 | 29 |
| % Wt Gain H₂O | 18 | 18 | 19 | 19 |
| % Wt Gain | 11.8 | 10.8 | 8.3 | 7.8 |

All of the foregoing polymers displayed good fuel resistance and low temperature flexibility.

EXAMPLE 12

In a 250 mL 3-neck flask equipped with a stirrer, thermometer and condenser, 87.7 g (0.554 mol) of DEG-DVE and 112.3 g (0.616 mol) of DMDO are mixed and heated to 77° C. (about 170° F.). To the mixture is added 0.8 g (4.2 mmol) of VAZO® 67 catalyst. The reaction mixture is reacted at 82° C. (about 180° F.) for about 6 hours to afford 200 g (0.06 mol, yield 100%) of a low viscosity liquid polythioether resin having a thiol equivalent of 1625 and a functionality F of 2.0.

EXAMPLE 13

In a 250 mL 3-neck flask equipped with a stirrer, thermometer and condenser, 26.7 g (0.107 mol) of TAC, 56.4 g (0.357 mol) of DEG-DVE and 117.0 g (0.642 mol) of DMDO are mixed and heated to 77° C. (about 170° F.). To the mixture is added 0.8 g (4.2 mmol) of VAZO 67 catalyst. The reaction mixture is reacted at 82° C. (about 180° F.) for about 6 hours to afford 200 g (0.07 mol, yield 100%) of a high viscosity liquid polythioether resin having an equivalent of 800 and a functionality F of about 3.5.

EXAMPLE 14
Sealant Composition

A sealant composition including the DMDO/DEG-DVE polythioether polymer of Example 1 was compounded as follows (amounts in parts by weight):

| | |
|---|---|
| DMDO/DEG-DVE Polythioether | 100 |
| Calcium carbonate | 60 |
| Magnesium oxide | 1 |
| Phenolic resin | 1 |
| DMP-30 | 1 |
| Isopropyl alcohol | 3 |

The compounded polymer was mixed intimately with the epoxy resin curing agent of Examples 9–11 above, in the weight ratio of 10:1 and cured at ambient temperature and humidity. The following physical properties were obtained for the cured composition:

| | |
|---|---|
| Cure hardness at 25° C. | 60 Shore A |
| Tensile strength at break | 550 psi |
| Elongation at break | 600% |
| Notched tear strength | 100 p/i |
| Low-temperature flexibility (AMS 3267 § 4.5.4.7) | passed |

EXAMPLE 15
Sealant Composition

A sealant composition including the ECHDT/DEG-DVE polythioether polymer of Example 9 was compounded as follows (amounts in parts by weight):

| | |
|---|---|
| ECHDT/DEG-DVE Polythioether | 100 |
| Calcium carbonate | 54 |
| Hydrated aluminum oxide | 20 |
| Magnesium oxide | 1 |
| Phenolic resin | 1 |
| Hydrogenated terphenyl plasticizer | 6 |
| DMP-30 | 1 |
| Isopropyl alcohol | 3 |

The compounded polymer was mixed intimately with an epoxy resin curing agent in the weight ratio of 10:1 and cured at ambient temperature and humidity. The following physical properties were obtained for the cured composition:

| | |
|---|---|
| Cure hardness at 25° C. | 72 Shore A |
| Tensile strength at break | 550 psi |
| Elongation at break | 450% |
| Notched tear strength | 85 p/l |
| Low-temperature flexibility | passed |

EXAMPLE 16
OH-Terminated Capped Polythioether

In a 500 ml flask, 275.9 g (1.09 mol) PLURIOL® E-200 divinyl ether, 174.7 g (0.95 mol) DMDO, 28.7 g (0.30 mol) 3-mercaptopropanol and 1.83 g (7.3 mmol) TAC were mixed. The mixture was heated to 70° C., and 2.3 g (12 mmol) VAZO® 67 were added slowly. The reaction mixture was stirred and heated at 85–90° C. for 4 hours to afford 480 g (0.15 mol, yield 100%) of a polymer having an equivalent weight of 1670 (number average molecular weight=3200, functionality F=2.05).

EXAMPLE 17
OH-Terminated Capped Polythioether

In a 250 ml flask, 104.72 g (0.57 mol) DMDO, 80.73 g (0.51 mol) DEG-DVE and 14.96 g (0.13 mol) butanediol monovinyl ether were mixed and heated to 75° C. To the heated mixture 0.60 g (3 mmol) VAZO® 67 were added slowly. The reaction mixture was stirred and heated at 75–85° C. for 6 hours to afford 200 g (0.064 mol, yield 100%) of a clear, nearly colorless polymer with very low odor and a viscosity of 79 poise at 20° C. The equivalent weight was 1570 (number average molecular weight=3200, functionality F=2.00).

EXAMPLE 18
Vinyl-Terminated Polythioether

In a 250 ml flask, 97.63 g (0.53 mol) DMDO, 97.66 g (0.62 mol) DEG-DVE and 5.31 g (0.21 mol) TAC were mixed and heated to 70° C. To the heated mixture 0.80 g (4 mmol) VAZO® 67 were added slowly. The reaction mixture was stirred and heated at 85–90° C. for 4 hours to afford 200 g (0.11 mol, yield 100%) of a low-odor polymer having a $T_g$ of −68° C. and a viscosity of 25 poise at 20° C. The equivalent weight was 1570 (number average molecular weight=1900, functionality F=2.2).

EXAMPLE 19
Ethyl Vinyl Ether-Terminated Polythioether

In a 100 ml flask, 43.05 g (0.24 mol) DMDO, 34.22 g (0.22 mol) DEG-DVE and 2.84 g (0.04 mol) ethyl vinyl ether were mixed and heated to 80° C. To the heated mixture 0.28 g (1.5 mmol) VAZO® 67 were added slowly. The reaction mixture was stirred and heated at 85° C. for 6 hours to afford 80 g (0.02 mol, yield 100%) of a polymer having a $T_g$ of −67° C. and a viscosity of 64 poise at 20° C. (number average molecular weight=4100, functionality F=2.0).

What is claimed is:

1. A polymerizable composition comprising (i) about 30 to about 90 wt % of at least one polythioether, said at least one polythioether comprising a structure having the formula 1

$$—R^1—[—S(CH_2)_2—O—[—R^2—O—]_m—(CH_2)_2—S—R^1—]_n \quad 1$$

wherein $R^1$ denotes a divalent $C_{2-6}$ n-alkyl, $C_{3-6}$ branched alkyl, $C_{6-8}$ cycloalkyl or $C_{6-10}$ alkylcycloalkyl group, —[(—CH$_2$—)$_p$—X—]$_q$—(—CH$_2$—)$_r$—, or —[(—CH$_2$—)$_p$—X—]$_q$—(—CH$_2$—)$_r$— in which at least one —CH$_2$— unit is substituted with a methyl group, $R^2$ denotes methylene, a divalent $C_{2-6}$ n-alkyl, $C_{2-6}$ branched alkyl $C_{6-8}$ cycloalkyl or $C_{6-10}$ alkylcycloalkyl group, or —[(—CH$_2$—)$_p$—X—]$_q$—(—CH$_2$—)$_r$—, X is one selected from the group consisting of O, S and —NR$^6$—.

$R^6$ denotes H or methyl, m is a rational number from 0 to 10, n is an integer from 1 to 60, p is an integer from 2 to 6, q is an integer from 1 to 5, and r is an integer from 2 to 10, said at least one polythioether being a liquid at room temperature and pressure, said at least one polythioether having a glass transition temperature not higher than −55 C, (ii) a curing agent in an amount from about 90 to about 150% of stoichiometric based on the amount of at least one polythioether, and (iii) about 5 to about 60 wt % of a filler, with all wt % being based on the total weight of non-volatile components of the composition, wherein said composition is curable at a minimum temperature of 0 C.

2. The polymerizable composition of claim 1 which has a glass transition temperature $T_g$ not higher than −60° C.

3. The polymerizable composition of claim 1 which, when cured, has a percent volume swell not greater than 25% after immersion in JRF type 1 for one week at 60° C. and ambient pressure.

4. The polymerizable composition of claim 1 further comprising an additive selected from the group consisting of a pigment in an amount from about 0.1 to about 10 wt %, a thixotrope in an amount from about 0.1 to about 5 wt %, an accelerator in an amount from about 0.1 to about 5 wt %, a retardant in an amount from about 0.1 to about 5 wt %, an adhesion promoter in an amount from about 0.1 to about 5 wt %, and a masking agent in an amount from about 0.1 to about 1 wt %.

5. The polymerizable composition of claim 1 which comprises a mixture of at least two different polythioethers (i).

6. A polymerizable composition comprising (i) about 30 to about 90 wt % of at least one polythioether, said at least one polythioether comprising a structure having the formula 1

—R$^1$—[—S(CH$_2$)$_2$—O—[—R$^2$—O—]$_m$—(CH$_2$)$_2$—S—R$^1$—]$_n$— 1 wherein

R$^1$ denotes a divalent C$_{2-6}$ n-alkyl, C$_{3-6}$ branched alkyl, C$_{6-8}$ cycloalkyl or C$_{6-10}$ alkylcycloalkyl group, —[(—CH$_2$—)$_p$—X—]$_q$—(—CH$_{2r}$—, or —[(—CH$_2$—)$_p$—X—]$_q$—(—CH$_2$—)$_r$— in which at least one —CH$_2$— unit is substituted with a methyl group, R$^2$ denotes methylene, a divalent C$_{2-6}$ n-alkyl, C$_{2-6}$ branched alkyl, C$_{6-8}$ cycloalkyl or C$_{6-10}$ alkylcycloalkyl group, or —[(—CH$_2$—)$_p$—X—]$_q$—(—CH$_2$—)$_r$—, X is one selected from the group consisting of O, S and —NR$^6$—, R$^6$ denotes H or methyl, m is a rational number from 0 to 10, n is an integer from 1 to 60, p is an integer from 2 to 6, q is an integer from 1 to 5, and r is an integer from 2 to 10, said at least one polythioether being a liquid at room temperature and pressure, said at least one polythioether having a glass transition temperature not greater than −50 C, (ii) a curing agent in an amount from about 90 to about 150% of stoichiometric based on the amount of at least one polythioether, (iii) a plasticizer in an amount from about 1 to about 40 wt %, and (iv) about 5 to about 60 wt % of a filler, with all wt % being based on the total weight of non-volatile components of the composition, wherein said composition is curable at a minimum temperature of 0 C.

7. The polymerizable composition of claim 6 which has a glass transition temperature $T_g$ not greater than −55° C.

8. The polymerizable composition of claim 6 which, when cured, has a percent volume swell not greater than 25% after immersion for one week at room temperature and pressure.

9. The polymerizable composition of claim 6 wherein said plasticizer is selected from the group consisting of phthalate esters, chlorinated paraffins and hydrogenated terphenyls.

10. The polymerizable composition of claim 6 further comprising an additive selected from the group consisting of a pigment in an amount from about 0.1 to about 10 wt %, a thixotrope in an amount from about 0.1 to about 5 wt %, an accelerator in an amount from about 0.1 to about 5 wt %, a retardant in an amount from about 0.1 to about 5 wt %, an adhesion promoter in an amount from about 0.1 to about 5 wt %, and a masking agent in an amount from about 0.1 to about 1 wt %.

11. The polymerizable composition of claim 6 which comprises a mixture of at least two different polythioethers (i).

* * * * *